United States Patent [19]

Medlin, Jr.

[11] 4,328,053
[45] May 4, 1982

[54] APPARATUS AND METHOD FOR RETREADING TIRES

[76] Inventor: Henry C. Medlin, Jr., 485 Union St. South, Concord, N.C. 28025

[21] Appl. No.: 181,779

[22] Filed: Aug. 27, 1980

[51] Int. Cl.³ .............................................. B29H 17/36
[52] U.S. Cl. ..................................... 156/96; 150/54 B; 156/394 FM
[58] Field of Search .................... 156/96, 126–129, 156/394 FM; 150/54 R, 54 B

[56] References Cited

U.S. PATENT DOCUMENTS

| | | | |
|---|---|---|---|
| 3,779,833 | 12/1973 | Reppel | 156/394 |
| 3,925,129 | 12/1975 | Blankenship | 156/394 |
| 4,075,047 | 2/1978 | Brodie et al. | 156/96 |
| 4,105,482 | 8/1978 | Wapelhorst et al. | 156/96 |
| 4,126,169 | 11/1978 | Magnuson et al. | 150/54 B |
| 4,240,851 | 12/1980 | King | 156/96 |

Primary Examiner—John E. Kittle

[57] ABSTRACT

This invention relates to apparatus and method for retreading tires with a continuous precured and premolded tread strip. A flexible substantially air impervious annular envelope overlies the tread strip and aids in holding the tread strip in intimate contact with an underlying tire casing while the tread strip is bonded to the tire casing. An air porous band of drapable fabric is provided between the annular envelope and the tread strip and intimately engages the entire periphery of the tread strip during the bonding. This air porous band along with air porous straps secured thereto wick away and remove substantially all air initially entrapped underneath the envelope thereby permitting the retreading operation to be done at increased temperature and reduced time, as well as avoiding the problem of frequent replacing of ruptured envelopes.

7 Claims, 11 Drawing Figures

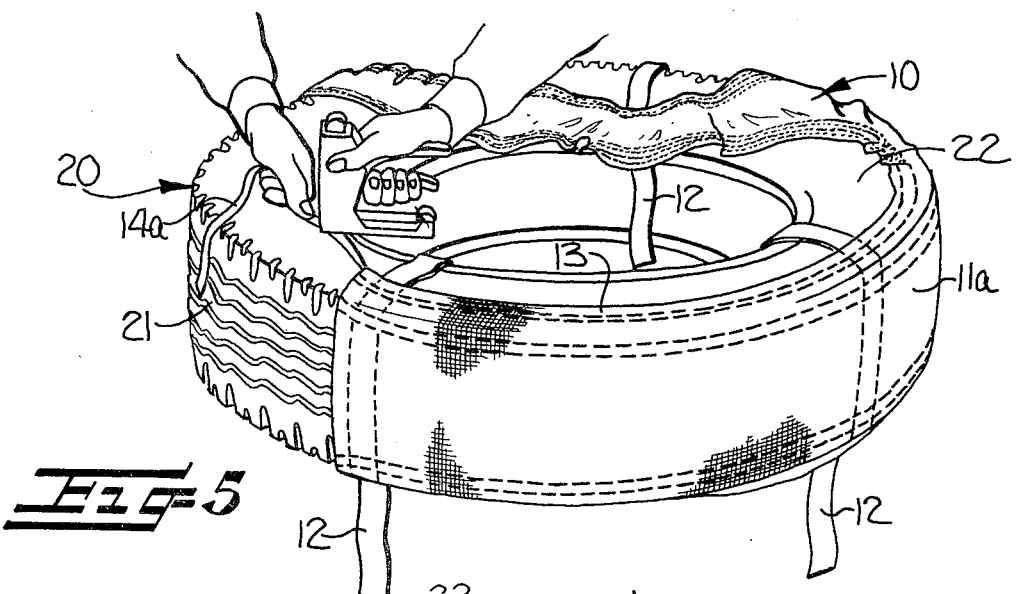
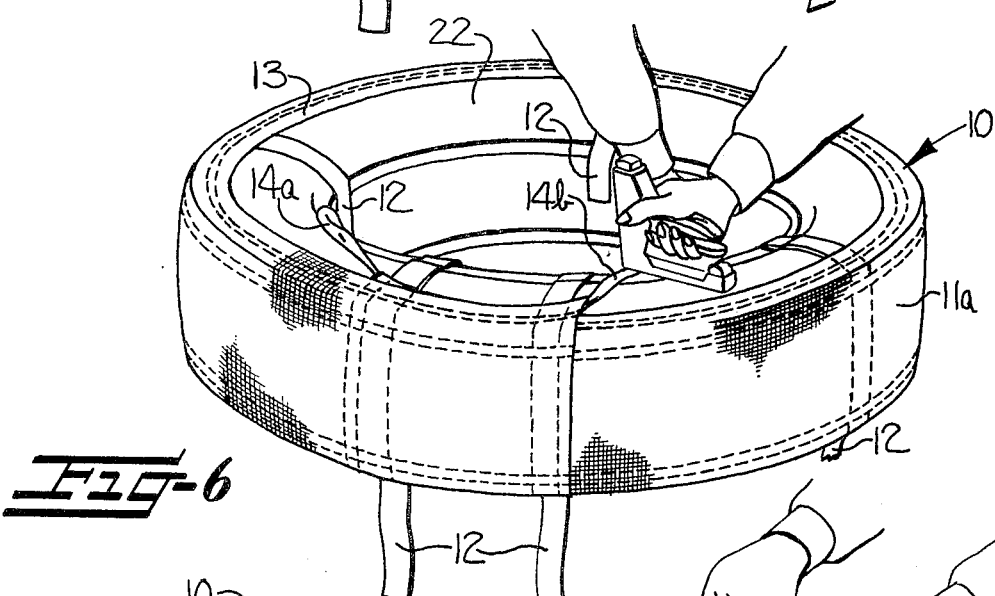
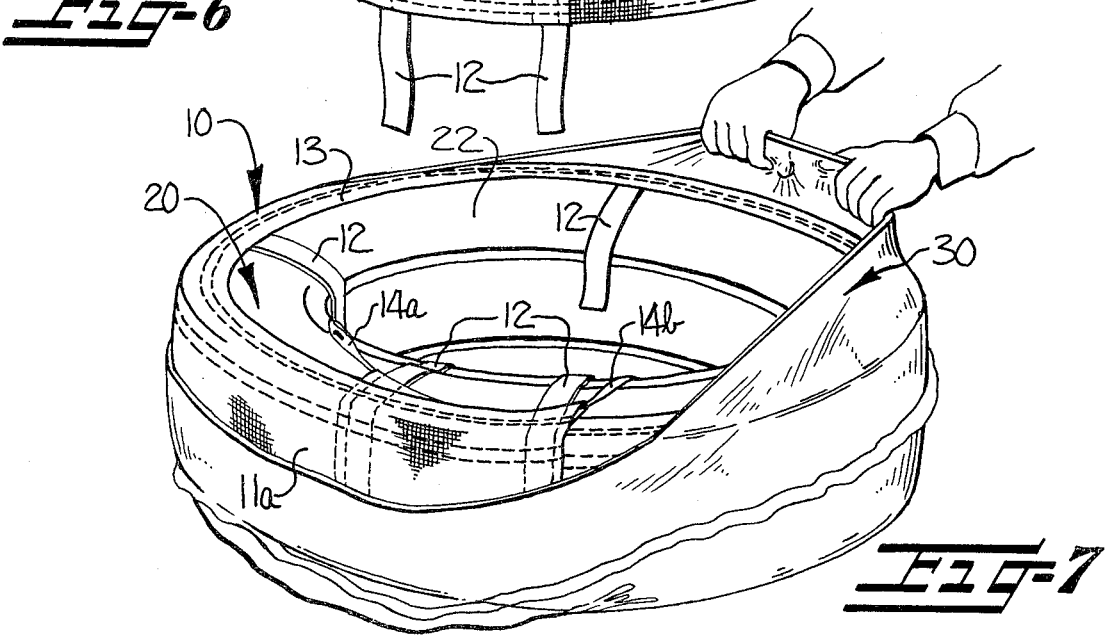

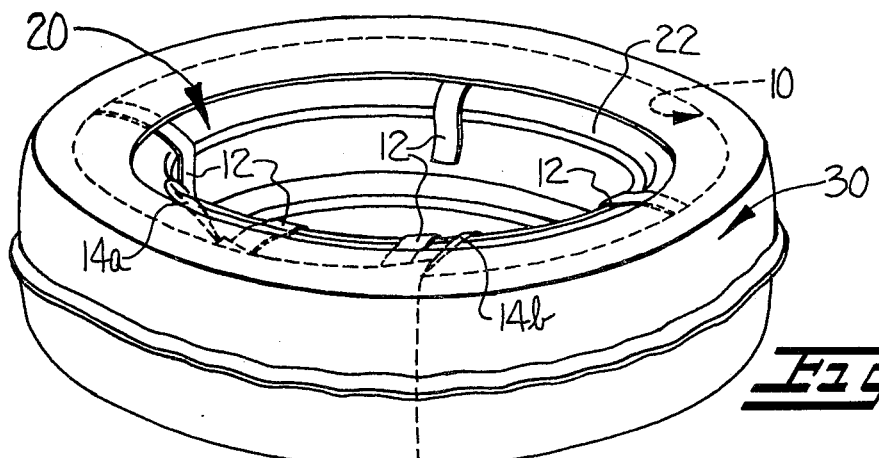
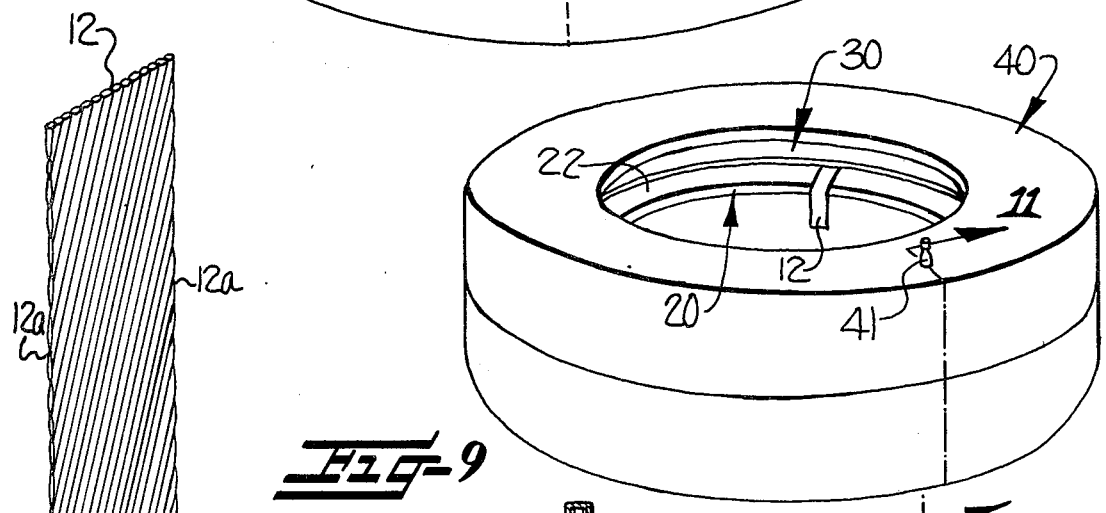
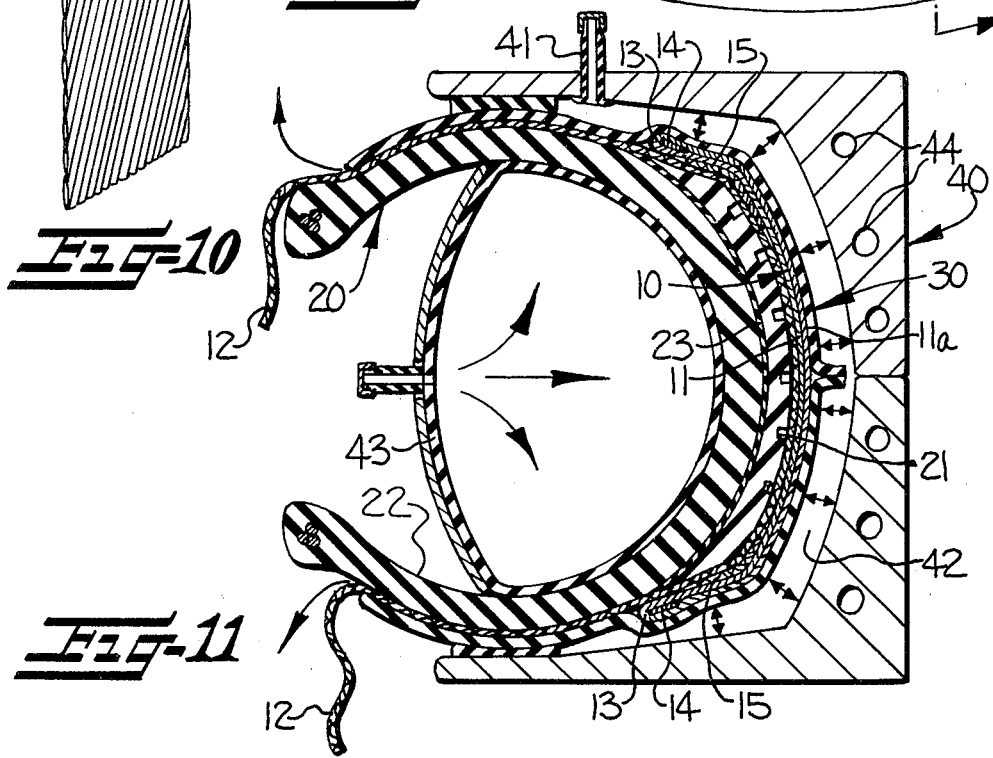

APPARATUS AND METHOD FOR RETREADING TIRES

FIELD OF THE INVENTION

This invention relates to apparatus and method for retreading tires with a precured and premolded tread strip and, more particularly, relates to the removal of undesirable entrapped air encountered therein.

BACKGROUND OF THE INVENTION

There are basically two types of practices predominantly utilized for the retreading of worn vehicle tires. One practice involves applying uncured rubber to a worn tire casing and then bonding such rubber to the tire casing and simultaneously forming a tread pattern in that rubber by heating and vulcanizing the rubber in a pattern forming mold. The other practice involves applying to the worn tire casing a strip of precured and premolded tread rubber in which a tread pattern has been previously formed and bonding that strip to the worn tire casing by use of heat and pressure. In this second practice, the curing and molding of the tread rubber prior to its bonding to the tire casing permits such curing and molding to be done at much greater pressures and temperatures than are usually possible when the curing and molding of the tread rubber are accomplished with the tread rubber on the tire casing, as are done in the first practice of retreading described above. Accordingly, this second practice of retreading yields a retreaded tire in which the tread rubber is generally denser and more durable.

To further explain how this practice of retreading is carried out, unvulcanized rubber, commonly referred to as cushion gum, is typically used as a bonding material to bond the precured and premolded tread rubber to the tire casing. This bonding material may be supplied already adhered to the under surface of a continuous strip of precured tread rubber or it may be supplied separately in strip form itself for application to the tire casing in preparation for application of the strip of precured tread rubber. Whichever is done, these materials are then subjected to heat and pressure to vulcanize the bonding material and permanently bond the tread rubber to the tire casing.

One favored manner for applying this heat and pressure involves placing the tire casing, onto which the bonding material and tread rubber have been applied, into a flexible, air impervious rubber envelope, and then placing this entire tire assembly into a curing chamber for bonding. The rubber envelope is utilized to aid in holding the bonding material and tread rubber in intimate contact with the underlying tire casing during curing and to also aid in properly applying bonding pressure to the tread rubber. However, upon the tire assembly being placed in the envelope, there is generally always some air entrapped between the surface of the tread rubber and the overlying envelope, so that when the enveloped tire assembly is placed in the curing chamber and heated to effect curing of the bonding material, this entrapped air expands and forms air pockets which arise under the envelope at various locations. There are thus formed localized points of increased pressure on the interior of the envelope which are also localized points of increased temperature. As a result, the envelope tends to prematurely rupture at such points, and as a further result the tire assembly then being processed is not properly cured and bonded so that it usually must be then stripped down to its components and rebuilt, all resulting in substantial loss of time, labor and material.

Notwithstanding these undesired results, it does not appear that their true causes have been fully appreciated before. Clearly, these undesired results have not been satisfactorily avoided. To the extent that there have been some efforts made to attempt to eliminate a portion of the air entrapped within the envelope, these efforts have been primarily limited to removing the air entrapped between the tire casing and tread rubber in the area of the bonding material to try to improve the bonding of the tread rubber to the tire casing. One such attempt has involved the placement of a network of spaced apart porous cords across the crown of the tire casing, and thereafter covering the cords with the bonding material and tread rubber. Another attempt has involved the placement of porous fabric straps adjacent the side walls of the tire casing, but not extending across the tread strip. Neither of these attempts have accomplished any removal of air from the face of the tread strip since the materials used therein have not contacted this area.

Other apparent attempts, while still having as their primary goal the removal of air from the bonding material area, have provided some minimal contact with the face of the tread strip to accomplish some minimal wicking of air therefrom. One of these attempts has involved extending the fabric straps mentioned above across and over the top of the tread strip. Another, described in U.S. Pat. No. 3,779,833 to Reppel, has involved fitting a nylon mesh bag around the entire prepared tire prior to applying the air impervious rubber envelope around the tire and this nylon bag. Yet, again, such attempts have had as their primary goal the elimination of air from the bonding area, as opposed to the tread strip, which has been only minimally contacted.

Finally, one other apparent attempt has involved a network of widely spaced apart porous cords applied across the tread strip. But even this attempt has involved only minimal contact with but a small portion of the face of the tread strip thereby resulting in minimal air wicking from that area and leaving the basic problems of premature envelope failure and unduly restricted curing temperatures still existing.

SUMMARY OF THE INVENTION

With the foregoing shortcomings and deficiencies in mind, it is an object of this invention to provide apparatus for the retreading of tires with a precured and premolded tread strip by which substantially all entrapped air pockets are eliminated underneath a tire curing envelope so that envelope life during tire curing can be substantially increased and so that tire curing can be accomplished at higher than usual temperatures in order to reduce the tire curing time.

Another object of this invention is to provide apparatus for removing entrapped air pockets encountered in the retreading of tires which apparatus is adapted for use with tires of different sizes and tread widths.

Another object of this invention is to provide a method of retreading tires in which substantially all entrapped air pockets are eliminated and in which air wicking and removing straps are also used to properly position an air wicking band.

BRIEF DESCRIPTION OF THE DRAWINGS

Some of the objects and features of this invention having been stated, others will become more apparent as the description proceeds, when taken in connection with the accompanying drawings, in which:

FIG. 5 is a perspective view illustrating initial installation of the air wicking means onto an uncured tire;

FIG. 6 is a perspective view illustrating final installation of the air wicking means onto an uncured tire;

FIG. 7 is a perspective view illustrating an annular envelope being positioned onto an uncured tire and over the air wicking means;

FIG. 8 is a perspective view illustrating a prepared tire surrounded by an annular envelope ready for curing;

FIG. 9 is a perspective view illustrating a prepared tire being cured in a curing chamber;

FIG. 10 is an enlarged perspective view showing the construction of an air porous strap of the air wicking means; and FIG. 11 is a partial sectional view along the line 11—11 of FIG. 9.

DESCRIPTION OF THE ILLUSTRATED EMBODIMENTS

Figure 1:
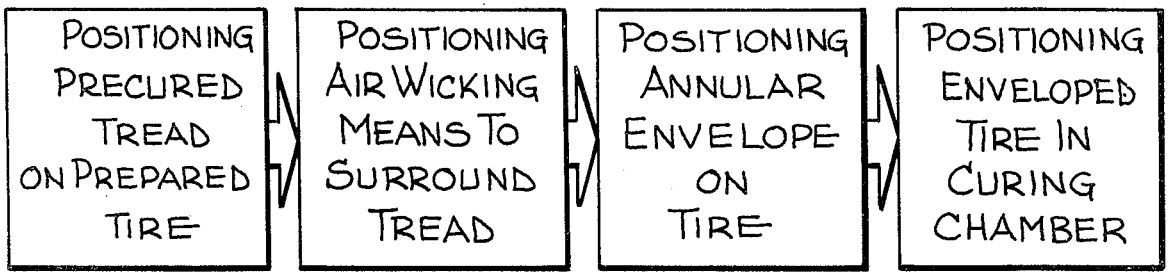
FIG. 1 is a diagrammatic representation of the steps of the method of this invention.

Referring now more particularly to the drawings, the retreading of a tire in accordance with the method of this invention proceeds step by step generally from left to right of the diagrammatic representation of FIG. 1. While FIG. 1 is intended to briefly represent the basic steps undertaken in practicing the method of the invention, it is believed that a better understanding of the method, as well as the apparatus of the invention, may be obtained by a description given with reference to the air wicking means of the invention and its relation to a tire in the various stages of being retreaded, all as is shown in the remaining figures.

Figure 2:
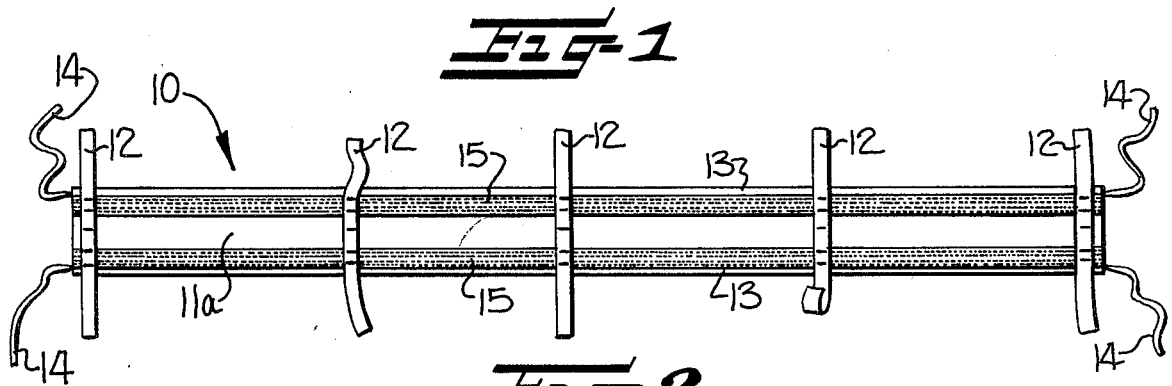
FIG. 2 is a bottom plan view of a preferred embodiment of the air wicking means of the invention.
Figure 3:
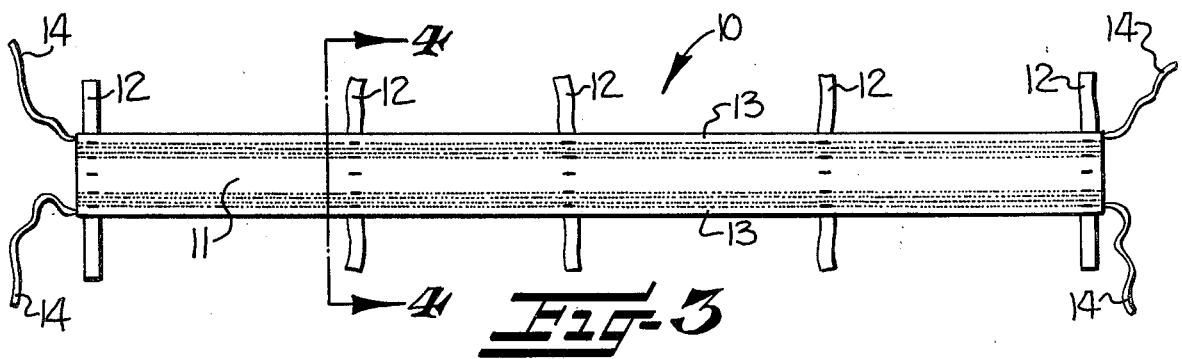
FIG. 3 is a top plan view of the preferred embodiment of the air wicking means of the invention.
Figure 4:
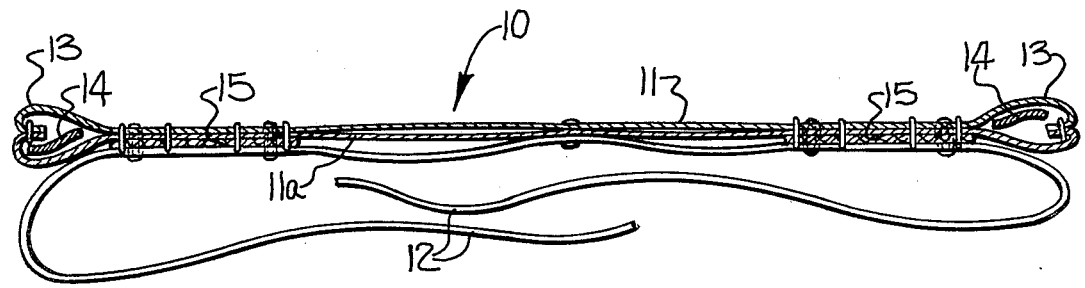
FIG. 4 is a sectional view along the line 4—4 of FIG. 3.

First shown in FIGS. 2, 3 and 4 is a preferred form of the air wicking means 10 of the invention formed of an air porous elongate band 11 of drapable fabric and characterized by having a plurality of air porous straps 12 and by having tubular passageways 13 extending along each side of the elongate band 11 throughout the length thereof. A drawstring 14 is positioned in each passageway 13 and serves as will be shown later to properly position the elongate band 11 for use. The details of construction and function of these various components of the air wicking means will be described further below after an initial description of the overall retreading process.

Referring now to FIGS. 5 through 9, there are shown therein the various stages of application of the elongate band 11 over the tread strip 21 of the tire 20 prepared for curing as well as how the tire 20 is thereafter handled and cured. Firstly, as shown in FIG. 5, is a tire 20 which has been readied for the final stages of retreading. As shown in greater detail in FIG. 11, the tire 20 to be retreaded comprises a tire casing 22 which has been prepared for retreading by having its former worn tread surface removed and its crown area buffed smooth. Onto the crown area of the tire casing 22 has been placed a layer of bonding material 23 and onto the layer of bonding material 23 has been placed a continuous precured and premolded tread strip 21 of a desired tread pattern. The bonding material 23 is a form of unvulcanized rubber in a naturally tacky state which when sufficiently heated cures and vulcanizes and permanently bonds the tread strip 21 to the tire casing 22.

Returning to FIG. 5, a portion of the elongate band 11 of the air wicking means is positioned over the tread strip 21 of the tire 20 prepared for curing. This portion is secured by tacking or stapling into the thickened bead areas of the tire casing 22 the proximal near ends 14a of the drawstrings 14. The remainder of the elongate band 11 is then positioned over the entire periphery of the tread strip 21, being positioned centrally of the tread strip 21 widthwise, and desirably in overlapping relationship with the beginning portion of the elongate band, as shown in FIG. 6. By so overlapping the elongate band 11, no portion of the tread strip 21 is left uncovered. Also this overlapping relationship allows tires of various sizes and diameters to be covered by the same sized elongate band 11. The distal far ends 14b of the drawstrings are then grasped and pulled tight to aid in gathering and positioning the elongate band 11 in surrounding relationship with the tread strip 21, and then tacked or stapled into the thickened bead areas of the tire casing 22.

Next, as shown in FIG. 7, a flexible substantially air impervious annular envelope 30, typically made of rubber, is stretched and positioned in overlying relationship about the tire 20 and elongate band 11. FIG. 8 shows the annular envelope 30 in place about the tire 20 so that, as better shown in FIG. 11, it overlies the tread strip 21 and surrounds the same for aiding in holding the tread strip 21 in intimate contact with the underlying tire casing 22 until the bonding material 23 therebetween has been sufficiently heated in the later curing step to effect the desired bonding of the tread strip 21 to the tire casing 22.

FIGS. 9 and 11 show the envelope tire 20 of FIG. 8 in a conventional tire curing chamber 40 in which the tire casing 22 is adapted to be positioned with the tread strip 21 overlying the tire casing 22 and wherein the annular envelope 30 in turn overlies and surrounds the tread strip 21 and wherein means for creating a pressure within the curing chamber 40 are provided in the form of a fluid introduction valve 41 for incoming air or steam into the space 42 in the interior of the curing chamber 40 and also in the form of an expansible bag 43 within the tire casing 22. These pressure creating means are adapted to cooperate with the annular envelope 30 and tire casing 22 for providing forces to assist in bonding the tread strip 21 to the tire casing 22. The curing chamber 40 is also provided with heat source means such as channels 44 for the containment of circulating steam or electrical resistance heaters to heat and cure the bonding material 23.

Returning now to FIGS. 2, 3 and 4 and to a more detailed description of the construction and function of the air wicking means 10 of the invention, the air wicking means 10 is made up primarily of the air porous elongate band 11 of drapable fabric. Desirably the fabric is of knit construction to enhance the drapability thereof since the band 11 should conform as closely as possible to the contours of the tread strip 21 including its tread features. The elongate band 11 may be formed of a variety of textile materials and is desirably formed of polyester material such as dacron which is relatively durable and not susceptible to damage when subjected to the relatively high temperatures encountered during curing of the bonding material. Furthermore, considering the rough treatment likely to be encountered in repeated use in a tire retreading shop, the band is preferably of a multi-layer construction for added longevity.

A plurality of air porous straps 12 are secured to the elongate band 11, such as by machine stitching, and extend laterally thereof with free portions of the straps adapted to extend from opposite sides of the band along opposite sides of the tire casing 22 to beyond the overlying envelope 30, as shown more specifically in FIG. 11. These straps take the form of pairs of opposing straps with each pair of straps desirably being integrally formed. These air porous straps 12 are preferably formed of a particularly durable woven synthetic fabric such as nylon having integrally woven selvages defining nonraveling side edges 12a thereof as shown in FIG. 10. These straps must be of such structural integrity so as not to be unduly compressed and thereby rendered ineffective when sandwiched between the annular envelope 30 and the tire casing 22 as shown in FIG. 11. Also these straps 12 are desirably coated with a silicone based protectant so as to prevent bonding material 23 coming in contact therewith from adhering to the straps 12 in use. Insofar as the placement of the air porous straps 12 along the elongate band 11 is concerned, straps are desirably positioned adjacent each end of the band 11 with additional straps being provided therebetween and secured to medial portions of said band 11 between said endmost straps at relatively equally spaced intervals.

As noted eariler, tubular passages 13 formed by lines of stitching extend along each side of the elongate band 11. Drawstrings 14 are positioned in each passageway and serve to aid in positioning the band 11. These drawstrings are formed of durable woven synthetic material such as nylon, as are the air porous straps 12.

Shown in FIGS. 2 and 4 are a pair of spaced apart air porous tapes 15 which are spaced inwardly from the drawstring passages 13 and are connected by stitching to the elongate band 11. These tapes 15 extend substantially throughout the length of the band 11 along the inner surface 11a thereof and serve for defining therebetween that area of the band 11 adapted to be in engagement with the peripheral surface of the tread strip 21. Said pair of tapes 15 are adapted to be positioned to overlie the inherently tacky bonding material 23 along opposite side portions of the tire casing 22 for thus serving to protectively shield the band 11 from intimate contact with and adhesion to the bonding material 23. These tapes are desirably formed of synthetic material such as nylon comparable to that of the air porous straps 12 and are also desirably silicone treated for further resistance to the bonding material 23. Also like the straps 12, the tapes 15 have integrally woven selvages defining non-raveling side edges thereof. Straps 12 are desirably located along the inner surface 11a of the elongate band, and the medial portions of the straps 12 extend across a pair of tapes 15 with stitching connecting the pair of tapes 15 to the elongate band 11 and the integrally formed pair of straps 12, as shown in FIGS. 2, 3 and 4.

Considering now specifically how the air wicking means 10 of the invention is preferably used in connection with other tire retreading apparatus, there is provided an air porous elongate band 11 of drapable fabric of a length greater than the circumference of the tire 20 being retreaded and of a width less than that of the annular envelope 13. In practice in working with tires of typical sizes, the smallest band 11 is typically about twelve feet long and about twelve inches wide. This provides a sufficient length of band to completely surround a number of the smaller sized tires and a width of band that desirably terminates in foreshortened relationship to respective opposite side portions of the overlying envelope 30.

The band 11 thereby intimately engages the tread strip 21 and wicks away and collects the air entrapped between the annular envelope 30 and the tread strip 21. The air so collected then travels along and is routed through the interstices of the fabric of the band 11 and then of the straps 12 until it exits from underneath the envelope 30. The straps 12 also contact the area between the tread strip 21 and the tire casing 22 to wick away and remove substantially all air also entrapped therein. The air porous straps 12 are of sufficient structural integrity to allow the air to pass therethrough without the straps 12 being unduly impinged by the sides of the tire casing 22 and the envelope 30 being pushed together against the sides of the curing chamber 40 during curing.

Most desirably, the band 11 is of a width only slightly greater than the width of the tread strip 21, since it is just the face of the tread strip 21 that must be contacted and wicked by the band 11. A slight excess of band width is desired to protect the inner surface of the envelope 30 from the comparatively sharp side edges of the tread strip 21. If the band 11 is substantially wider than the tread strip 21 then the band may well contact the bonding material 23 which during curing may ooze into the band 11 and undesirably adhere to it and diminish its air wicking properties. Nonetheless, if it is desired to provide a band of such width which may be wide enough to be suitably used with tires of a number of sizes, it may be necessary in some instances for the band to be of such width as to extend adjacent the bonding material 23. The problem of bonding material contact may then be alleviated by providing the pair of spaced apart tapes 15. These tapes 15 are adapted to be positioned to overlie the inherently tacky bonding material 23 along opposite side portions of the tire casing to protectively shield the band 11.

The band 11 so provided is then positioned in intimate engagement with the tread strip 21 throughout the entire periphery of the tread strip 21 prior to positioning the air impervious envelope 30 around the tread strip 21. The endmost air porous straps 12 adjacent the ends of the band 11 may be grasped during installation to arrange the band about the tire 20 with the ends of the band in overlapping relation. Any of the air porous straps 12 may also be grasped to properly position the band substantially centrally widthwise of the tread strip 21 with opposing side portions of the band extending along side portions of the tread strip 21. So positioned the pairs of opposing air porous straps 12 extend substantially radially of the tire casing 22 beyond the envelope 30 for air escapement.

After this initial positioning of the band 11, the side portions of the band are gathered to position them in more intimate contact with the tire casing 22 by grasping and pulling drawstrings 14 extending along side portions of the band 11 and securing the ends of the drawstrings to the tire casing 22. Upon being positioned, the ends of the bands are held and maintained in their overlapping relationship throughout the curing of the bonding material 23. Then the annular envelope 30 of predetermined cross-sectional width is placed in overlying pressure exerting relation to the tread strip 21 and surrounds the same for aiding in holding the same in intimate contact with the tire casing 22 until the bonding material 23 therebetween has been sufficiently heated to effect the desired bonding of the tread strip to the tire casing. Thereby the cure is effected and any air is initially entrapped beneath the air impervious envelope 30 is then quickly wicked away outwardly beyond the confines of the envelope by the underlying band of air porous fabric and straps.

In such manner there is substantially eliminated, therefore, the problem of entrapment of air pockets underlying the envelope 30 and the oftentimes resulting attendant rupturing of the envelope by the heated expansion of the entrapped air during curing. Eliminating the entrappped air pockets also permits the retreading operation to be performed at temperatures higher than heretofore permissible so as to permit reducing the time cycle for effecting the retreading operation as well as avoiding the problem of frequent replacing of ruptured envelopes. Indeed, it has been determined that by effecting with this invention a 10% increase in curing temperatures from about 320° F. to about 350° F., there has been achieved about a 50% reduction in curing time. All of these results yield significant savings in both material and time.

It is to be understood that the forms of the invention herein shown and described are to be taken as particular embodiments of the invention and that various changes in the shape, size and arrangement of parts thereof may be resorted to without departing from the spirit of the invention, or the scope of the authorized claims.

What is claimed is:

1. In an apparatus for retreading tires with a continuous precured and premolded tread strip and wherein a flexible substantially air impervious annular envelope overlies the tread strip and surrounds the same for aiding in holding the tread strip in intimate contact with an underlying tire casing until a bonding material therebetween has been sufficiently heated to effect the desired bonding of the tread strip to the tire casing, said retreading apparatus having a curing chamber in which the tire casing is adapted to be positioned with the tread strip overlying the tire casing and wherein the annular envelope in turn overlies and surrounds the tread strip and wherein means for creating a pressure within the curing chamber is provided and is adapted to cooperate with the envelope and tire casing for providing forces to assist in bonding the tread strip to the tire casing, the combination therewith of means underlying the envelope and adapted to intimately engage the tread strip throughout the entire periphery of the tread strip for wicking away and removing substantially all air initially entrapped underneath the envelope between the interior surface of the envelope and the peripheral face of the tread strip as well as substantially all air initially entrapped between the tread strip and the tire casing, said means for wicking away and removing such entrapped air comprising an air porous elongate band of drapable fabric adapted to be positioned to underlie the envelope between the interior surface thereof and the peripheral surface of the tread strip and with opposite ends of the band in overlapping relation and with opposite side portions of the band extending along opposite side portions of the tread strip, a pair of spaced apart air porous tapes connected to the band and extending substantially throughout the length of the band along the inner surface thereof and defining therebetween that area of the band adapted to be in engagement with the peripheral surface of the tread strip, said pair of tapes being adapted to be positioned to overlie the inherently tacky bonding material along opposite side portions of the tire casing for thus serving to protectively shield the band from intimate contact with the bonding material and a plurality of air porous straps secured to said band and extending laterally thereof with free portions of the straps adapted to extend from opposite sides of the band along opposite sides of the tire casing to beyond the overlying envelope, whereby any air that initially might be entrapped underneath the air impervious annular envelope may quickly be wicked away outwardly beyond the confines of the envelope by the underlying band of air porous fabric and straps.

2. In an apparatus according to claim 1 wherein said air porous band is formed of knit fabric to enhance the drapability thereof around the tread strip, and wherein said pair of tapes and said straps are formed of woven fabric having integrally woven selvages defining non-raveling side edges thereof.

3. In an apparatus according to claim 2 wherein said knit air porous band is formed of polyester material and wherein said pair of woven tapes and said woven straps are formed of a nylon material.

4. In an apparatus according to claim 1 wherein said plurality of air porous straps comprise pairs of opposing straps with each pair of straps being integrally formed and having medial portions extending across said pair of tapes.

5. In an apparatus according to claim 4 including stitching connecting said pair of tapes to said band and said pairs of straps to said tapes.

6. In a method of retreading tires with a continuous precured and premolded tread strip in a curing chamber and wherein the tread strip is placed in overlying intimate contact with the surface of a tire casing with a bonding material therebetween to effect the desired bonding of the tread strip to the tire casing and wherein a flexible air impervious annular envelope is placed in overlying pressure exerting relation to the tread strip and surrounds the same for aiding in holding the same in intimate contact with the tire casing until the bonding material therebetween has been sufficiently heated to effect the desired bonding of the tread strip to the tire casing, the improvement therewith of wicking away and removing substantially all air initially entrapped underneath the annular envelope between the interior surface of the envelope and the peripheral face of the tread strip as well as substantially all air initially entrapped between the tread strip and the tire casing and, said improvement comprising providing an air porous elongate band of drapable fabric of a length greater than the circumference of the tire and with a pair of spaced apart air porous tapes connected to the band and extending substantially throughout the length of the band along the inner surface thereof and with pairs of opposing air porous straps extending laterally from opposite sides thereof, positioning the band of fabric with that area of the band therebetween said pair of tapes in intimate engagement with the tread strip throughout the entire periphery of the tread strip prior to positioning the air impervious annular envelope around the tread strip and while positioning the band substantially centrally of the tread strip with the ends of the band arranged in overlapping relation and with opposing side portions of the band extending along side portions of the tread strip and with said pair of tapes overlying the bonding material along opposite side portions of the tire casing for thus serving to protectively shield the band from intimate contact with the bonding material and with the straps extending substantially radially along the sides of the tire casing and beyond the opposite side portions of the overlying envelope whereby any air that might initially be entrapped beneath the air impervious envelope may quickly be wicked away outwardly beyond the confines of the envelope by the underlying band of air porous fabric and straps.

7. In a method according to claim 6 including gathering side portions of the band to position the side portions of the band in more intimate relation with the tire casing.

* * * * *

UNITED STATES PATENT AND TRADEMARK OFFICE
CERTIFICATE OF CORRECTION

PATENT NO. : 4328053

DATED : May 4, 1982

INVENTOR(S) : Henry C. Medlin, Jr.

It is certified that error appears in the above-identified patent and that said Letters Patent are hereby corrected as shown below:

Column 6, line 3, "13" should be --30--;
Column 7, line 9, after "air" insert --that--.

Signed and Sealed this

Seventh Day of September 1982

[SEAL]

Attest:

GERALD J. MOSSINGHOFF

Attesting Officer     Commissioner of Patents and Trademarks